United States Patent
Xu

(10) Patent No.: US 8,612,748 B2
(45) Date of Patent: Dec. 17, 2013

(54) DATA PROTECTION METHOD FOR E-MAIL AND ELECTRONIC DEVICE HAVING DATA PROTECTION FUNCTION

(75) Inventor: Zhong-Lin Xu, Shenzhen (CN)

(73) Assignees: Fu Tai Hua Industry (Shenzhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 0 days.

(21) Appl. No.: 13/559,798

(22) Filed: Jul. 27, 2012

(65) Prior Publication Data
US 2013/0262861 A1    Oct. 3, 2013

(30) Foreign Application Priority Data
Mar. 29, 2012 (CN) .......................... 2012 1 0087293

(51) Int. Cl.
*H04L 29/06*    (2006.01)
(52) U.S. Cl.
USPC ........................................ 713/156

(58) Field of Classification Search
USPC .......................................... 713/156
See application file for complete search history.

(56) References Cited

U.S. PATENT DOCUMENTS

2012/0167233 A1* 6/2012 Gillum ........................ 726/29

* cited by examiner

*Primary Examiner* — Kambiz Zand
*Assistant Examiner* — Aubrey Wyszynski
(74) *Attorney, Agent, or Firm* — Altis Law Group, Inc.

(57) ABSTRACT

A computerized data protection method prevents data of an electronic device from being compromised through e-mail. A digital certificate is installed in the electronic device, and one or more safe e-mail addresses are configured and stored in the digital certificate. Predetermined data stored in the electronic device are correlated with the one or more safe e-mail addresses. When the predetermined data need to be sent to a target e-mail address, whether the target e-mail address matches with one of the safe e-mail addresses is verified. If the target e-mail address matches with one of the safe e-mail addresses, the predetermined data is sent to the target e-mail address.

10 Claims, 2 Drawing Sheets

DATA PROTECTION METHOD FOR E-MAIL AND ELECTRONIC DEVICE HAVING DATA PROTECTION FUNCTION

BACKGROUND

1. Technical Field

Embodiments of the present disclosure relate to data security technologies, and particularly to a data protection method for e-mail and an electronic device having a data protection function.

2. Description of Related Art

Many people use electronic mail (e-mail) to stay in touch and to exchange digital information with each other and their colleagues when at work. However, e-mail messages can be compromised, for example, the data may be sent to a wrong e-mail address due to the sender's mistakes. For companies especially, incalculable losses may occur when some important or confidential data is compromised. Therefore, there is a room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one".

Figure 1:
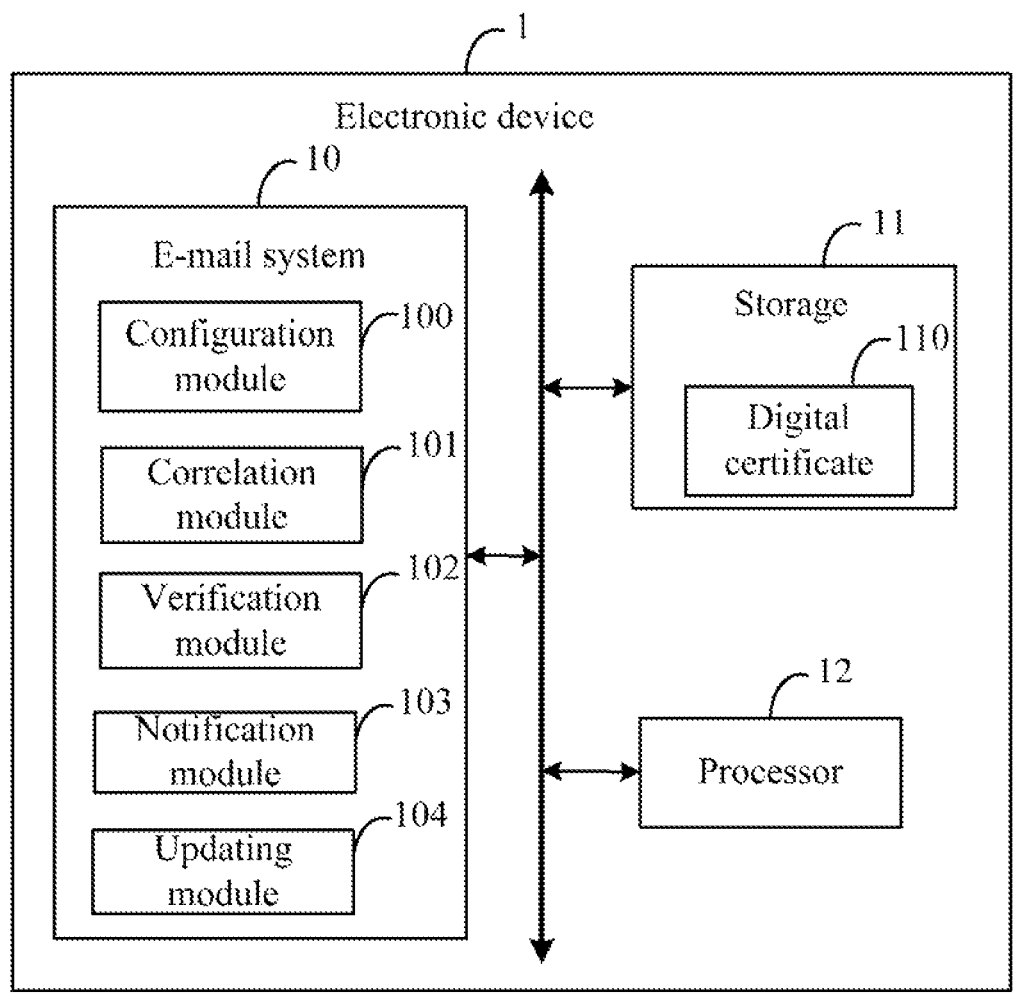
FIG. 1 is a schematic block diagram illustrating one embodiment of an electronic device including an e-mail system.

FIG. 1 is a schematic block diagram illustrating one embodiment of an electronic device 1. The electronic device 1 includes an e-mail system 10, a storage 11, and a processor 12. The storage 11 stores a digital certificate 110. The digital certificate 110 may be downloaded from a certification authority (CA) center, and installed in the storage 11. The CA center is a trusted third party that is trusted by both an owner of the digital certificate 110 and other party relying upon the digital certificate 110. In the embodiment, the digital certificate 110 may be for example an e-mail certificate issued by the CA center. The electronic device 1 may be, for example, a personal computer, a server, a smart mobile terminal, or other similar device having an e-mail function. FIG. 1 shows one example of the electronic device 1, and the electronic device 1 can include more or fewer components than those shown in the embodiment, or have a different configuration of the components.

The e-mail system 10 may include a plurality of programs in the form of one or more computerized instructions stored in the storage 11 and executed by the processor 12 to perform operations of the electronic device 1. In the embodiment, the e-mail system 10 includes a configuration module 100, a correlation module 101, a verification module 102, a notification module 103, and an updating module 104. In general, the word "module", as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage devices. Some non-limiting examples of non-transitory computer-readable medium include CDs, DVDs, BLU-RAY, flash memory, and hard disk drives.

The configuration module 100 configures one or more safe e-mail addresses in the digital certificate 110. In the embodiment, the one or more safe e-mail addresses may be configured by an administrator or a user of the digital certificate 110, which is authorized to receive some important, confidential, or private data sent from the electronic device 1 through the e-mail.

The correlation module 101 correlates predetermined data stored in the electronic device 1 with the configured one or more safe e-mail addresses. In the embodiment, the predetermined data can be any data which need to be protected, such as, Excel data sheets, Word files, photos, and videos. In the embodiment, the predetermined data may be any type of data stored in the electronic device 1 that have a particular symbol indicating whether the data should be protected. The particular symbol of the predetermined data cannot be modified without authorization of an owner or an administrator of the electronic device 1. For example, the particular symbol may be a file attribute (e.g., a security level) of the predetermined data.

The verification module 102 verifies whether a target e-mail address matches with one of the safe e-mail addresses, when the predetermined data need to be sent to the target e-mail address. If the target e-mail address matches with one of the safe e-mail addresses, the verification module 102 sends the predetermined data to the target e-mail address.

The notification module 103 prevents the sending of the predetermined data, and notifies a user of the electronic device 1 to reset the target e-mail address, if the target e-mail address does not match any of the one or more safe e-mail addresses. In addition, the notification module 103 may trigger the electronic device 1 to generate alarm signals, such as audio or physical (vibrational) signals, to warn the user that the target e-mail address is not safe.

The updating module 104 updates the digital certificate 110 at regular intervals, such as two weeks or a month. In the embodiment, the CA center may set an expiration data for the digital certificate 110 when the digital certificate 110 is downloaded. The updating module 104 may update the digital certificate 110 by downloading a new version of the digital certificate from the CA center according to the expiration data.

Figure 2:
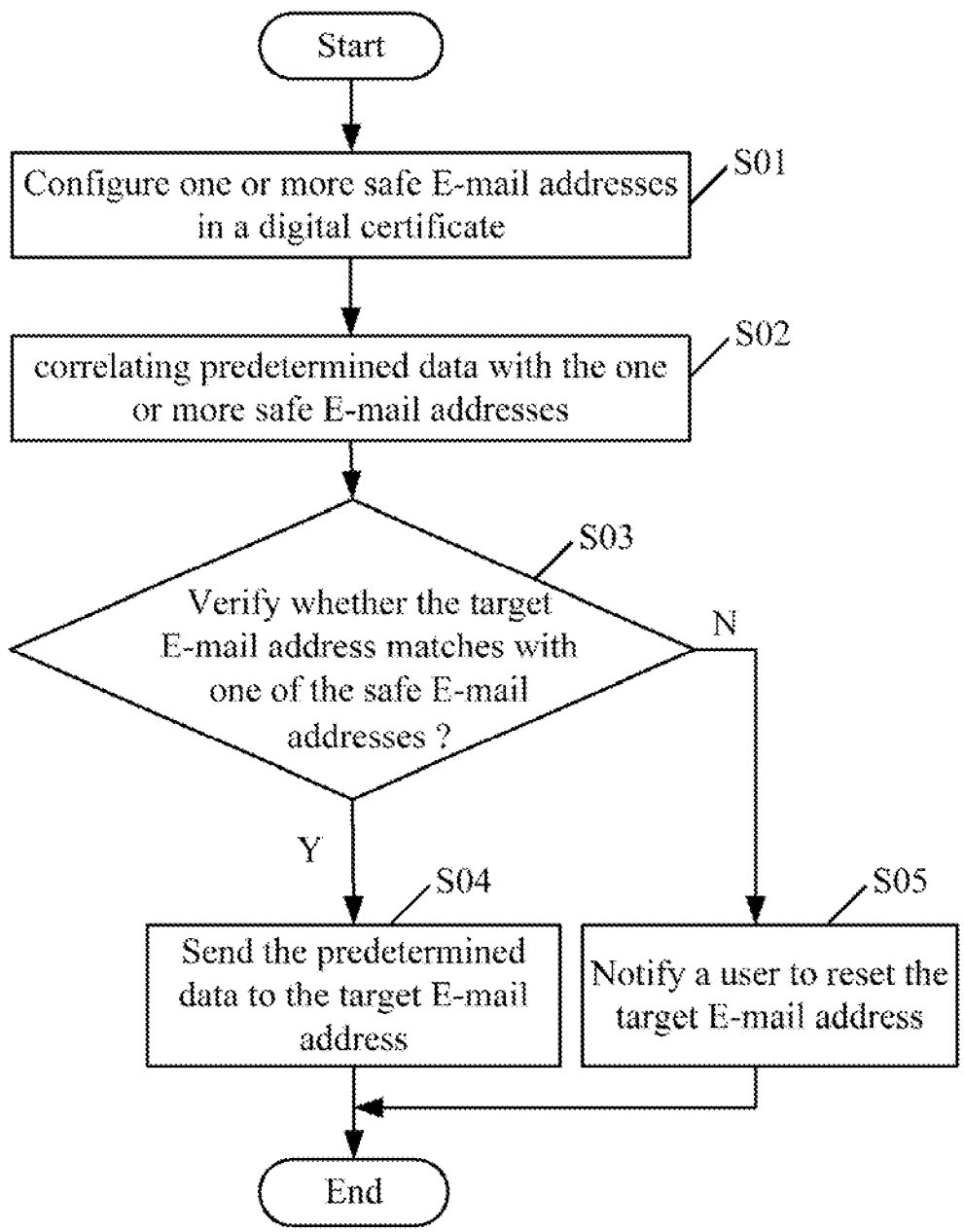
FIG. 2 is a flowchart of one embodiment of a data protection method of the electronic device of FIG. 1 for preventing data from being compromised through e-mail.

FIG. 2 shows a flowchart of one embodiment of a data protection method of the electronic device of FIG. 1 for preventing data from being compromised through e-mail. Depending on the embodiment, additional steps may be added, others removed, and the ordering of the steps may be changed.

In step S01, the configuration module 100 configures one or more safe e-mail addresses in the digital certificate 110.

In step S02, the correlation module 101 correlates predetermined data stored in the electronic device 1 with the configured one or more safe e-mail addresses.

In step S03, when the predetermined data need to be sent to a target e-mail address, the verification module 102 verifies whether the target e-mail address matches with one of the safe e-mail addresses. If the target e-mail address matches with one of the safe e-mail addresses, step S04 is implemented. If the target e-mail address does not match with any of the one or more safe e-mail addresses, step S05 is implemented.

In step S04, the verification module 102 sends the predetermined data to the target e-mail address, ends the procedure.

In step S05, the notification module 103 prevents the sending of the predetermined data, and notifies a user of the electronic device 1 to reset the target e-mail address. In addition, the notification module 103 further triggers the electronic device 1 to generate alarm signals, such as voices or vibrations, to warn the user that the target e-mail address is not safe.

Additionally, in the embodiment, the digital certificate 110 may be regularly updated at regular intervals by downloading a new version of the digital certificate from the CA center according to an expiration data of the digital certificate 110.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized data protection method of an electronic device, the electronic device comprising a digital certificate downloaded from a certification authority, the method comprising:

configuring one or more safe e-mail addresses in the digital certificate, the one or more safe e-mail addresses being authorized to receive predetermined data stored in the electronic device;

correlating the predetermined data stored in the electronic device with the one or more safe e-mail addresses in the digital certificate;

in response to the predetermined data being sent to a target e-mail address, verifying whether the target e-mail address matches one of the safe e-mail addresses; and sending the predetermined data to the target e-mail address when the target e-mail address matches one of the safe e-mail addresses, and preventing the sending of the predetermined data to the target e-mail address when the target address does not match any of the one or more safe addresses.

2. The method according to claim 1, further comprising: notifying a user of the electronic device to reset the target e-mail address when the target e-mail address does not match any of the one or more safe addresses.

3. The method according to claim 2, wherein the notifying step comprises:

triggering the electronic device to generate alarm signals to warn the user that the target e-mail address is not safe.

4. The method according to claim 1, further comprising: updating the digital certificate at regular intervals.

5. The method according to claim 1, wherein the digital certificate is an e-mail certificate.

6. An electronic device, comprising:

a storage, the storage storing a digital certificate downloaded from a certification authority;

a processor; and one or more programs stored in the storage and executed by the processor, the one or more programs comprising:

a configuration module that configures one or more safe e-mail addresses in the digital certificate, the one or more safe e-mail addresses being authorized to receive predetermined data stored in the electronic device;

a correlation module that correlates the predetermined data stored in the electronic device with the one or more safe e-mail addresses in the digital certificate; and a verification module that verifies whether a target e-mail address matches with one of the safe e-mail addresses when the predetermined data is sent to the target e-mail address, sends the predetermined data to the target e-mail address when the target e-mail address matches one of the safe e-mail addresses, and prevents the sending of the predetermined data to the target e-mail address when the target address does not match any of the one or more safe addresses.

7. The electronic device according to claim 6, wherein the verification module further notifies a user of the electronic device to reset the target e-mail address when the target e-mail address does not match with any of the one or more safe addresses.

8. The electronic device according to claim 7, wherein the notification module further triggers the electronic device to generate alarm signals to warn the user that the target e-mail address is not safe.

9. The electronic device according to claim 6, wherein the one or more programs further comprise:

an updating module that updates the digital certificate at regular intervals.

10. The electronic device according to claim 6, wherein the digital certificate is an e-mail certificate.

* * * * *